(12) United States Patent
Ying et al.

(10) Patent No.: US 12,276,538 B1
(45) Date of Patent: Apr. 15, 2025

(54) REGIONAL TRAFFIC HEAVY LOAD DIGITAL WEIGHING METHOD AND SYNERGY SYSTEM

(71) Applicant: Ningbo Langda Technology Co., Ltd., Ningbo (CN)

(72) Inventors: Guogang Ying, Ningbo (CN); Jieliang Hu, Ningbo (CN); Wenda Zhang, Ningbo (CN); Liuqi Ying, Ningbo (CN)

(*) Notice: Subject to any disclaimer, the term of this patent is extended or adjusted under 35 U.S.C. 154(b) by 0 days.

(21) Appl. No.: 18/822,025

(22) Filed: Aug. 30, 2024

(30) Foreign Application Priority Data

Apr. 24, 2024 (CN) .......................... 202410494785.6

(51) Int. Cl.
G01G 19/03 (2006.01)
G01M 5/00 (2006.01)

(52) U.S. Cl.
CPC .......... G01G 19/03 (2013.01); G01M 5/0008 (2013.01)

(58) Field of Classification Search
CPC .............................. G01C 19/03; G01M 5/0008
USPC .................................................. 177/1
See application file for complete search history.

(56) References Cited

U.S. PATENT DOCUMENTS

| | | | |
|---|---|---|---|
| 8,955,386 B2 * | 2/2015 | Petschacher | G01M 5/0066 73/788 |
| 11,692,885 B2 * | 7/2023 | Ye | G06T 7/0002 702/41 |
| 2002/0154029 A1 * | 10/2002 | Watters | G01D 5/48 340/870.07 |
| 2008/0056589 A1 * | 3/2008 | Lee | G06V 20/695 382/236 |
| 2016/0238438 A1 | 8/2016 | Chen et al. | |

FOREIGN PATENT DOCUMENTS

| | | | | |
|---|---|---|---|---|
| CN | 110414077 A | 11/2019 | | |
| CN | 112539816 A | 3/2021 | | |
| CN | 115240111 A | 10/2022 | | |
| CN | 117058600 | * 11/2023 | ............. | G06V 20/41 |
| CN | 117058600 A | 11/2023 | | |
| CN | 117390551 A | 1/2024 | | |
| CN | 117454318 A | 1/2024 | | |
| CN | 118089902 | * 5/2024 | .......... | G01M 5/0008 |

(Continued)

OTHER PUBLICATIONS

Xu Yongji et al., "Vehicle Load Effect of Highway Bridges Based on the Data Taken From Highway Toll Station's Weight System", vol. 14, No. 1, Feb. 15, 2016, pp. 6-75.

*Primary Examiner* — Jacques M Saint Surin (57) ABSTRACT

The present application discloses a regional traffic heavy load digital weighing method and synergy system, the weighting method includes: based on data of a physical weighing system available in a region and basic data of a bridge in the region, selecting a reference physical weighing system at a position and a number M and determining a reasonable number N of bridge group transfer layers; based on the reference physical weighing system, constructing a corresponding single digital bridge scale model; obtaining a branch scale network model based on the reference physical weighing system through migration learning and correction; composing a regional digital scale network model based on branch scale network models corresponding to different reference physical weighing systems.

10 Claims, 2 Drawing Sheets

(56) References Cited

FOREIGN PATENT DOCUMENTS

| WO | 2014176625 | A1 | 11/2014 |
| WO | 2019033185 | A1 | 2/2019 |
| WO | 2023147375 | A2 | 8/2023 |

* cited by examiner

REGIONAL TRAFFIC HEAVY LOAD DIGITAL WEIGHING METHOD AND SYNERGY SYSTEM

CROSS-REFERENCE TO RELATED APPLICATIONS

The present application claims priority to Chinese Patent Application No. 2024104947856, filed Apr. 24, 2024, the entire disclosure of which is incorporated herein by reference.

TECHNICAL FIELD

The present application relates to the technical field of structural health monitoring of bridges, particularly to a regional traffic heavy load digital weighing method.

BACKGROUND

Real-time acquisition of vehicle load information is one of the important research bases for structural health monitoring and analysis based on vehicle-bridge coupling, prediction of remaining life of existing bridges, and early warning of overrun. Therefore, the physical weighing system is usually installed before the vehicle on the bridge or the fixed control station for weight detection of the vehicle, which provides the basis for the bridge health monitoring analysis of the bridge and overlimit enforcement.

Existing vehicle load detection techniques and the corresponding defects are as follows:

(1) using a dynamic weighing (WIM) system. Although the error of measurement can be guaranteed under the normal driving condition of the vehicle, the high construction cost, troublesome installation and operation and maintenance, and the need to interrupt the traffic make it difficult to achieve full regional coverage.

(2) using pure computer vision to judge weight of the vehicle by model recognition. Although this method can identify the whole region of the monitored vehicles in the region, the limitation is that there is a large bias in the judgement of the weight of trucks only through the appearance.

(3) Tracking of WIM system weighing data using computer vision. In practice, the uncertainty of vehicle travelling is large, and it is difficult to guarantee the accurate measurement of each vehicle load by the WIM system, and because of the difficulty of full coverage of the weighing system, this method has a limited identification range.

(4) Bridge Weigh-in-motion (BWIM) vehicle weight inversion based on structural response, or through influence lines or using neural networks. However, the identification of weight of the vehicle is only an analytical feedback of the structural response (for example, the weighing result is obtained from the structural response after being on the bridge, which can neither be used as the basis for enforcement of the bridge nor directly used to analyse the safety status of the structure), which cannot further bring out the value of synergy sharing of the data; meanwhile, because of the reliance on the weighing system, the identification range of this method is limited.

Based on this, and with the deepening of the concept of regional cluster management, the economics of the one-bridge-one-system model is extremely low, and it is of great significance to study the network-level identification technology for regional traffic heavy loads.

SUMMARY

One of the objects of the present application is to provide a regional traffic heavy load digital weighing method capable of addressing at least one of the deficiencies in the background art.

One of the objects of the present application is to provide a regional traffic heavy load digital synergy system capable of addressing at least one of the deficiencies in the background art.

In order to achieve the above at least one purpose, the technical solution adopted in the present application is a regional traffic heavy load digital weighing method, which includes:

Step S100: based on data of a physical weighing system available in a region and basic data of a bridge in the region, selecting a reference physical weighing system MVW[i, 0] of a position and a number M, $1 \leq i \leq M$, and determining a reasonable number N of bridge group transfer layers;

Step S200: based on the reference physical weighing system, constructing a corresponding single digital bridge scale model MVW[i, 1], where $1 \leq i \leq M$;

Step S300: obtaining a branch scale network model MVW{[i, j]} based on the reference physical weighing system through migration learning and correction, $1 \leq i \leq M$, $j=1, 2, \ldots, N$;

Step S400: composing digital scale network models MVW{[i, j]} on the region based on branch scale network models corresponding to different reference physical weighing systems, $i=1, 2, \ldots, M$, $j=1, 2, \ldots, N$;

the Step S100 includes:

Step S110: based on the provided data, drawing an overall traffic bridge network distribution in the region;

Step S120: marking bridge groups with high technical condition ratings and corresponding weighing systems in a vicinity;

Step S130: based on a principle of minimizing error transmission and a principle of minimizing cost of model consumption, selecting a weighing system of the position from the weighing systems marked in the step S120 as the reference physical weighing system MVW [i, 0], where $1 \leq i \leq M$;

the step S200 includes:

Step S210: constructing a structural response monitoring system at a key position of the bridge and a positive lateral traffic splicing identification system before the vehicle is on the bridge, to obtain a spatio-temporal matrix of the deformation data Deformation(i, j) and a vehicle feature input information matrix Info_in(i, j), respectively;

Step S220: obtaining a vehicle feature output information matrix Info_out(i, j) based on a data fusion of the step S210;

Step S230: passing, through a license plate number, the vehicle feature output information matrix Info_out(i, 0) corresponding to the reference physical weighing system MVW [i, 0] to the positive lateral traffic splicing identification system as an output of the single digital bridge scale model, where $1 \leq i \leq M$, and using response data of the structural response monitoring system as an input of the single digital bridge scale model, to obtain a dataset [MVW(i, 0) ($1 \leq i \leq M$), Deformation(i, 1)] of the reference physical weighing system corresponding to an entity bridge;

Step S240: using a deep learning model to train the dataset [MVW(i, 0) (1≤i≤M), Deformation(i, 1)] and inversing to obtain the single digital bridge scale model MVW[i, 1], where, 1≤i≤M;

MVW(i, 0) denotes a weighing result of the reference physical weighing system, where, 1≤i≤M;

the Step S300 includes:

Step S310: obtaining a reference model of the single digital bridge scale model MVW[i, j−1] by replicating the single digital bridge scale model MVW[i, j] through migration learning, where, 1≤i≤M, 2≤j≤N;

S320: using the dataset [MVW(i, j−1) (1≤i≤M, 2≤j≤N), Deformation(i, j)]transferred by the license plate number to correct the reference model to obtain the corrected single digital bridge scale model MVW[i, j] and a corresponding weighing result MVW(i, j), where 1≤i≤M, 2≤j≤N;

S330: by analogy, forming the branch scale network model MVW{[i, j]} driven by the reference physical weighing system MVW[i, 0], where 1≤i≤M, j=1, 2, ..., N;

in the Step S400, when there exists a cross section between different branch scale network models in the regional digital scale network model, a cross model needs to be verified; when nodes of the regional digital scale network model suffer a decrease in an accuracy of the model due to structural damage during long-term use, a damaged model node and subsequent node models need to be adjusted.

In one embodiment, the data provided in Step S100 includes a name of the bridge, a position, a type of the bridge, a length of the bridge, a width of the bridge, a technical condition, and the time when the bridge is built and opened to traffic.

In one embodiment, in the Step S220, vehicle load information is obtained by identifying the spatio-temporal matrix of the deformation data Deformation(i, 1) through a neural network algorithm, and the vehicle load information is fused with vehicle monitoring data of the bridge; wherein the neural network algorithm adopts a long and short-term memory network model that fuses physical information.

In one embodiment, the cross model is validated by a formula:

$$\frac{|MVW(a, b) - MVW(c, d)|}{MVW(c, d)} \leq p;$$

when the formula is established, the cross model is validated to pass; conversely, it needs to increase a training dataset to retrain a node model until the formula is established;

where 1≤a≤c≤M, 1≤b≤d≤N; a, c and b, d are different at a same time; p denotes a judgement threshold with a value of 0.05~0.1.

In one embodiment, the structural damage of the node in the regional digital weighing network model is judged by a formula:

$$\frac{|MVW(i, j-1) - MVW(i, j)|}{MVW(i, j)} \leq p;$$

when the formula is established, a structure corresponding to the node (i, j) is free of damage; conversely, it needs to add a new training dataset and retrain a node model MVW[i, j+x] according to the migration learning until the formula is established;

where 1≤i≤M, 1≤j≤N, 0≤x≤N−j; p denotes the judgement threshold with a value of 0.05~0.1.

A regional traffic heavy load digital synergy system classifies and shares and manages data obtained by the above regional traffic heavy load digital weighing method for performing health monitoring and analysis of the bridge, risk prediction and judgement, and auxiliary overload control.

The beneficial effects of the present application compared to the related art are:

(1) The present application provides a new idea and technical solution for replacing a dynamic weighing system that is traditional, costly and complicated to be maintained, which is particularly suitable for vehicle weighing in a wide region. By using existing physical weighing systems and intelligent technology, it is possible to achieve a vehicle load monitoring network with a lower cost, an easier maintenance and a wider coverage.

(2) The regional digital scale network model MVW{[i, j]}(i=1, 2, ..., M, j=1, 2, ..., N) achieves at most vehicle identification of all bridges in an M×N region, and accurately locates heavy traffic positions and routes. Using the provided real-time regional heavy load distribution data, bridge damage identification can be realized based on vehicle-bridge coupling analysis and the neural network, thereby providing favourable conditions for structural lightweight health monitoring.

(3) Dangerous bridges can be screened based on operational load information of known weights, so as to realize risk perception in the whole region and make advance prediction and judgement. In particular, real-time online optimization of driving paths of large vehicles can be achieved based on the structural safety of bridges.

(4) Automated information recognition of heavy vehicles, non-stop weighing detection, on-site photo and video information capture and recording, and remote overloading risk determination can be realized, to grasp the city's overloading risk of freight vehicles in real time. According to the risk of overloading, the intelligence board is used to accurately and proactively issue the actual weighing instruction to the nearby overloading station, which expands and extends the time and space of overloading enforcement and supervision, and realizes remote and near connection with fixed overloading stations, closed-loop investigation and control, thereby greatly improving the discovery rate, interception rate and investigation rate of overloading vehicles.

DETAILED DESCRIPTION OF THE EMBODIMENTS

In the following, the present application is further described in relation to specific embodiments, and it is to be noted that, on the premise of not conflicting, new embodiments may be formed by combining any of the embodiments described hereinafter or any of the technical features.

In the description of the present application, it is to be noted that for orientation words, such as the terms "center", "transverse", "longitudinal", "length", "width", "thickness", "up", "down", "front", "back", "left", "right", "vertical", "horizontal", "top", "Bottom", "inner", "outside", "clockwise", "counterclockwise", etc. indicative of orientation and positional relationships are based on the orientation or positional relationships shown in the accompanying drawings, and are merely for the purpose of facilitating the narration of the present application and simplifying the description, and are not intended to indicate or imply that the referred devices or elements must have a particular orientation, be constructed and operated in a particular orientation, and are not to be construed as limiting the specific scope of the present application.

It should be noted that the terms "first", "second", etc. in the specification and claims of the present application are used to distinguish similar objects, and need not be used to describe a particular order or sequence.

The terms "comprising" and "having" in the specification and claims of the present application, and any variations thereof, are intended to cover non-exclusive embodiments, e.g., processes, methods, systems, products, or equipment comprising a series of steps or units. equipment need not be limited to those steps or units that are clearly listed, but may include other steps or units that are not clearly listed or are inherent to those processes, methods, products or equipment.

Figure 1:
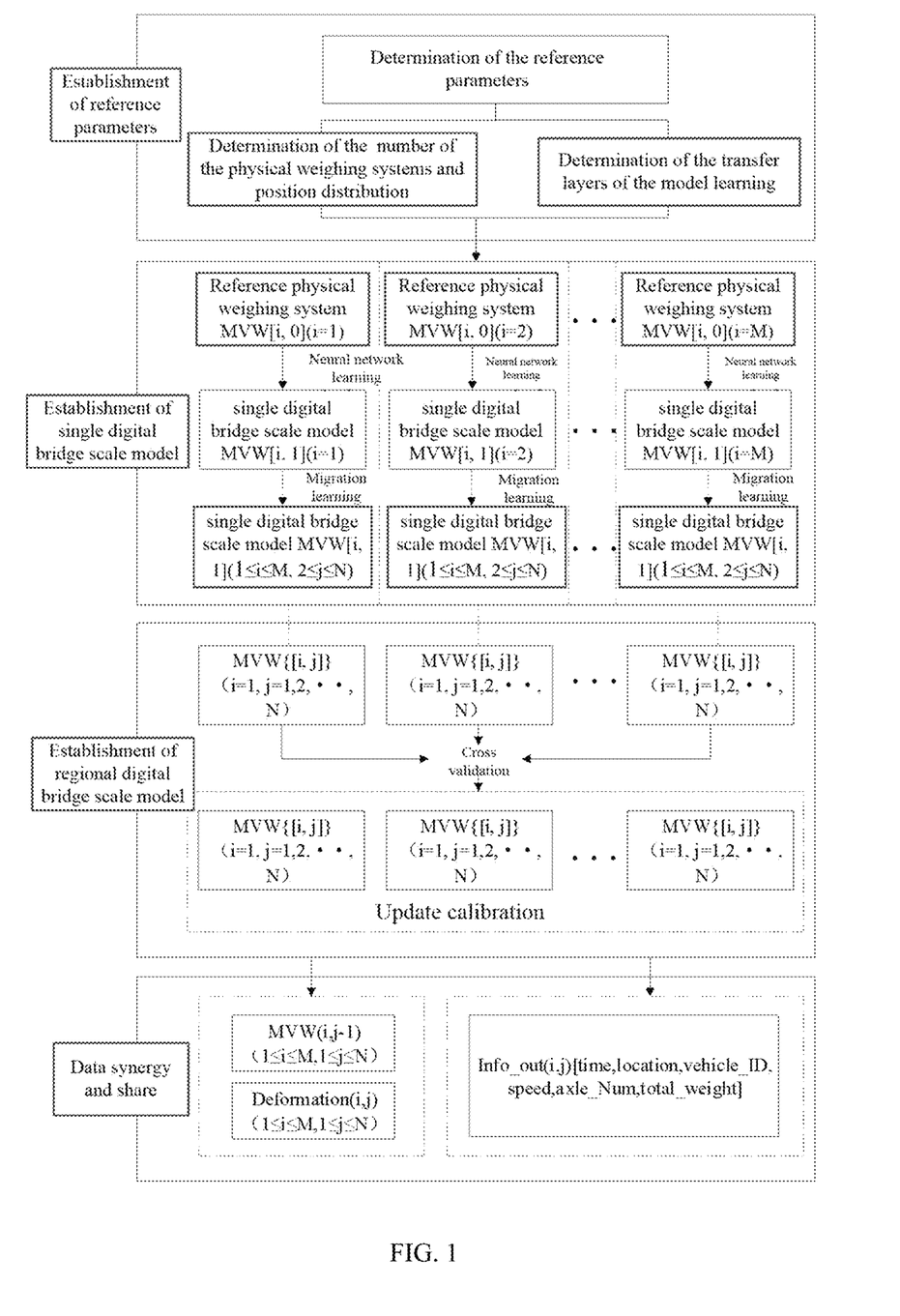
FIG. 1 is a schematic diagram of an overall workflow of the present application.

One aspect of the present application provides regional traffic heavy load digital weighing method, as shown in FIG. 1, a preferred embodiment includes:

Step S100: based on data of a physical weighing system available in a region and basic data of a bridge in the region, selecting a reference physical weighing system MVW[i, 0] of a position and a number M, $1 \le i \le M$, and determining a reasonable number N of bridge group transfer layers;

Step S200: based on the reference physical weighing system, constructing a corresponding single digital bridge scale model MVW[i, 1], where, $1 \le i \le M$;

Step S300: obtaining a branch scale network model MVW{[i, j]} based on the reference physical weighing system through migration learning and correction, $1 \le i \le M$, j=1, 2, . . . , N;

Step S400: composing a regional digital scale network model MVW{[i, j]} based on branch scale network models corresponding to different reference physical weighing systems, i=1, 2, . . . , M, j=1, 2, . . . , N.

It should be known that due to the decentralized construction of the physical weighing system, the likelihood of the vehicle that passes through the physical weighing system to then pass through the destination bridge is low; in other words, most of the vehicles that pass through the destination bridge do not pass through the physical weighing system, and even if they do, due to the long distances, there is loading and unloading of goods halfway, resulting in poorly timeliness of the data. Therefore, by establishing the single digital bridge scale model for the intermediate bridge, on the one hand, more vehicles that have not been physically weighed can be digitally weighed, expanding the source of weight data of the vehicle for the destination bridge, and after forming a network-level system, it can be realized that every heavy load going to the destination bridge can be weighed; on the other hand, by digital weighing of the intermediate bridge, it can be realized that the physically weighed vehicles can be tracked throughout the whole route, until they arrive at the destination bridge to give the precise weight of the vehicle.

It will be appreciated that the core idea of the present application is to use the physical weighing system in the existing region to evolve the bridge carriers along the route of the vehicles with known weights through manual training step by step into digital bridge scales that are capable of weighing the vehicle. Multiple physical weighing systems are driven together to derive and expand the single weighting bridge scale to form a digital scale network for the entire region, such that any node in the scale network has its input of weight of the vehicle supplied by the previous node, while the output of weight of the vehicle can be used as the input for the next node. That is, the present application provides a new idea and technical solution for replacing dynamic weighing systems that are conventional, costly and complicated to be maintained, especially for vehicle weighing over a wide region. By using existing physical weighing systems and intelligent technology, a vehicle load monitoring network with a lower cost, an easier maintenance and a wider coverage can be realized.

More specifically, constrained by high construction costs, troublesome installation and operation and maintenance, and the need to interrupt traffic, etc, the physical weighing system is difficult to achieve the full coverage of the region. In order to achieve the whole region of heavy load tracking, another method needs to be found, and the lightweight digital virtual weighing of vehicles passing through each bridge is a feasible means to establish the single digital bridge scale model MVW [i, j]($1 \le i \le M$, $1 \le j \le N$).

Meanwhile, in the process of regional traffic heavy load network level identification and tracking realization, it is necessary to consider the rapid construction of the single weighing model to reduce the construction cycle of the system. For regions with hundreds of bridges, such as a prefecture-level city, it is obviously impractical to train each bridge individually to form the single digital bridge scale model. Therefore, it is possible to select the reference physical weighing system from a branch network for training to form a corresponding single digital bridge scale model, and then use deep learning and migration learning to build corresponding digital bridge scales for other bridges in the branch network to form the branch scale network model. Finally multiple branch scale network models can be aggregated to form a digital scale network model of the region.

Based on the above analysis, the digital weighing method for regional traffic heavy load based on the regional traffic heavy load network level identification and tracking system proposed in the present application can be divided into four steps, which correspond to the four major modules of basic parameter determination, branch scale network model establishment, regional digital scale network model establishment, and data synergy sharing. For ease of understanding, the four modules described above will be specifically described below.

In the present embodiment, with respect to the determination of the reference parameters, i.e., how to carry out a reasonable selection of the reference physical weighing system, and the determination of the number of transfer layers based on the bridge groups corresponding to this reference physical weighing system. Then step S100 includes:

Step S110: based on the provided data, drawing an overall traffic bridge network distribution in the region;

Step S120: marking groups of bridges with high technical condition ratings and corresponding weighing systems in a vicinity;

Step S130: based on a principle of minimizing error transmission and a principle of minimizing cost of model consumption, selecting a weighing system of the position from the weighing systems marked in the step S120 as the reference physical weighing system MVW [i, 0], where 1≤i≤M.

It should be appreciated that in the process of recognition of vehicle loads using deep learning, the reference physical weighing system MVW[i, 0](1≤i≤M) provides a initial training dataset for the model, this process is critical, because it ensures that the basic data for the model training is highly accurate and practically relevant. There is an error transfer phenomenon in the migration learning to get a new single digital bridge scale model MVW[i, j](1≤i≤M, 2≤j≤N) by using the single digital bridge scale model MVW[i, j](1≤i≤M, 2≤j≤N) obtained by training with the artificial neural network. This means that the larger the value of N, the larger the transmitted error accumulates. And deep learning training and migration learning, and updating and calibration of the model all consume resources, which means that the larger the value of N, the higher the cost. On the other hand, too small N results in the need for a larger number of reference physical weighing systems, which is limited by the high construction cost of physical weighing systems. Therefore, it is crucial to choose a reasonable value of the number of transfer layers N.

The core of the present embodiment is a selection process of reference physical weighing systems based on the above mentioned limitation of the value of the number N of transfer layers. Specifically, based on the traffic data information of the region, vehicles can be tracked to obtain license plate-route data, and then a map of the overall traffic bridge network distribution in the region is drawn based on the obtained license plate-route data. After obtaining the overall traffic bridge network distribution map, the bridge groups with high technical condition rating and the corresponding weighing systems in the vicinity can be identified. Finally, taking into account the distribution position of the bridges and the limitations on the number N of transmission layers, a reasonable weighing system can be selected from the marked bridge groups and the corresponding weighing systems as the reference physical weighing system.

It should be known that the technical condition level of the bridge groups and the weighing system in the vicinity can be determined based on the time when the bridge opened to traffic. Generally, the later the bridges are opened to traffic, the higher the technical condition rating corresponds to.

In the present embodiment, the data provided in the Step S100 includes data of the physical weighing systems available in the region, and the own basic data of the bridges in the region. Specifically, it includes the name of the bridge, the position, the type of the bridge, the length of the bridge, the width of the bridge, the technical condition, and the time when the bridge is built and opened to traffic.

In this embodiment, the establishment of the branch scale network model includes there are three main steps, which are the establishment of a monitoring system, the establishment of the single digital bridge scale model in the vicinity of the reference physical weighing system, and the establishment of the branch scale network model. The following will provide a detailed description for the aforementioned three steps.

(i) The establishment of the monitoring system includes:

S210: Constructing a structural response monitoring system at a key position of the bridge and a positive lateral traffic splicing identification system before the vehicle is on the bridge, in order to obtain the spatio-temporal matrix of the deformation data Deformation(i, j) and a vehicle feature input information matrix, Info_in(i, j), respectively.

It should be appreciated that the physical weighing system is not always installed on the bridge, but can be a fixed control station at a designated position, and some bridges and their neighbourhood do not have the physical weighing system. Installing physical weighing systems on the bridge would not only increase the high construction costs, but also cause traffic jams due to construction. Therefore, a structural response monitoring system for the bridge can be constructed at the key position of the bridge to inverse the weight of the vehicle based on the structural response generated by the structural response monitoring system when the vehicle is on the bridge.

It is to be understood that the key position of the bridge is the most unfavourable section of the bridge, which is generally the mid-span position of the bridge. This position has the largest structural response, which is most favourable for the accuracy of inversing the weight of the vehicle, and the monitoring of the most unfavourable position of the bridge can serve as a structural health monitoring. Specifically, the structural response monitoring system is constructed at a bottom cross-section of the bridge at the key position of the bridge, and the structural response monitoring system includes a dynamic deflection monitoring unit, a measuring point target unit, a fill light and a terminal server, etc. The dynamic deflection monitoring unit can capture frame-by-frame images of a plurality of measuring point targets transversely arranged in the bottom cross-section of the bridge, and analyse the high-frequency dynamic deflection data by using digital image-related techniques, and ultimately output a spatio-temporal matrix of the corresponding the deformation data Deformation (i, j) of the bridge, which is based on the obtained deformation data to be able to perform inversing weight information of the vehicle.

It should be known that the dynamic deflection monitoring unit generally adopts a lightweight monitoring device, and the specific structure and working principle are known to those skilled in the art, so it will not be elaborated in detail herein. The lightweight monitoring device can reduce the construction cost and the construction difficulty; and the structural response monitoring system in principle only needs to be constructed on one span of the bridge, which can effectively shorten the construction time, but as a consideration of inversing the weight of the vehicle when multiple heavy vehicles are parallel in the transverse direction, multiple cross-sections can be selected for validation, which further reduces the possibility of the occurrence of the parallelism of the heavy vehicles during the algorithms identification.

It will also be appreciated that the positive lateral traffic splicing identification system is generally set up at the bridge head to detect and identify vehicles before they get on the bridge. The positive lateral traffic splicing identification system includes a front mounted bayonet capture unit, a side mounted bayonet capture unit, a fill light, and a terminal server. The front mounted bayonet capture unit captures the license plate of the vehicle for identification, the side mounted bayonet capture unit identifies axle of the vehicle from the side and in a direction perpendicular to the lane. In the terminal server, the front capture image is matched with the side capture image, and the vehicle speed is calculated from $v=\Delta l/\Delta t$ by the trigger distance difference $\Delta l$ and trigger time difference $\Delta t$ of the front mounted and side mounted capture units, to finally obtain the vehicle feature input information matrix by splicing recognition, Info_in(i, j)[time, position, vehicle_ID, speed, axle_Num, total_Weight(i, j−1)], i.e., containing the information of time, position, license plate, speed, number of axles, total weight, etc.

Figure 2:
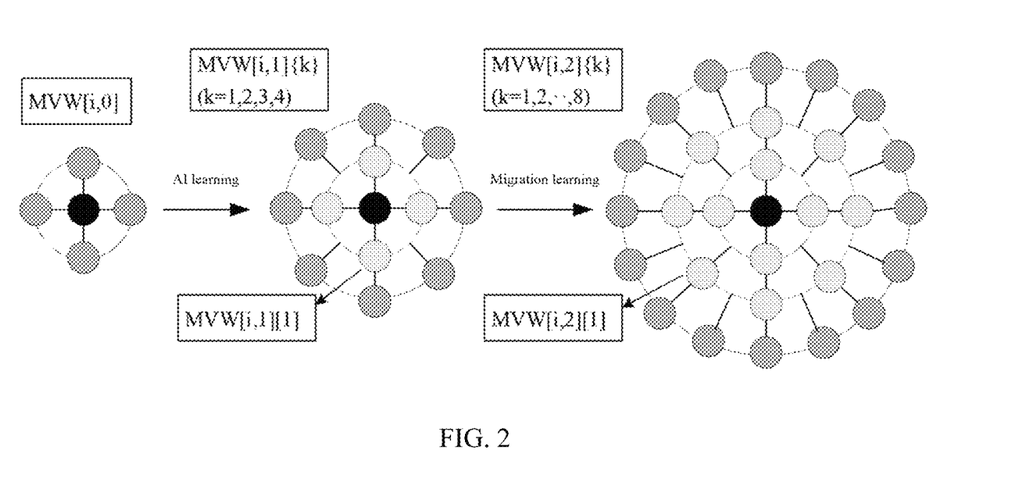
FIG. 2 is a schematic topology of one of the branch scale network models of the present application.

(ii) As shown in FIGS. 1 and 2, the establishment of the single digital bridge scale model includes:

Step S220: obtaining a vehicle feature output information matrix Info_out(i, j) based on a data fusion summary of the step S210;

Step S230: passing, through a license plate number, the vehicle feature output information matrix Info_out(i, 0) corresponding to the reference physical weighing system MVW [i, 0] to the positive lateral traffic splicing identification system as an output of the single digital bridge scale model, where $1 \le i \le M$, and using response data of the structural response monitoring system as an input of the single digital bridge scale model, to obtain a dataset [MVW(i, 0) ($1 \le i \le M$), Deformation(i, 1)] of the reference physical weighing system corresponding to an entity bridge;

Step S240: using a deep learning model to train the dataset [MVW(i, 0), ($1 \le i \le M$), Deformation(i, 1)] and inversing to obtain the single digital bridge scale model MVW[i, 1], where $1 \le i \le M$.

MVW(i, 0) ($1 \le i \le M$) denotes a weighing result of the reference physical weighing system.

It should be known that the vehicle feature output information matrix, Info_out(i, j), is specified as Info_out(i, j) [time, position, vehicle_ID, speed, axle_Num, total_Weight (i, j)], including time, position, license plate, speed, axle_Num, total weight, etc., which can be specifically represented as MVW(i, j).

It is to be understood that for step S230, when the vehicle passes through the reference physical weighing system, the weight and the license plate number information, etc. of the vehicle can be obtained. After the vehicle is on the bridge, the positive lateral traffic splicing recognition system may monitor the vehicle feature data of the vehicle, and match it with the vehicle information that passes through the reference physical weighing system based on the license plate number information of the vehicle, i.e., the vehicle feature output information matrix that passes through the reference physical weighing system, Info_out(i, 0), i.e., MVW(i, 0), is used as an output of the single digital bridge scale model of the entity bridge corresponding to the reference physical weighing system. And after the vehicle is on the bridge, the structural response monitoring system can monitor the structural response change of the bridge based on the vehicle, and the deformation data Deformation(i, 1) corresponding to this structural response change can also be used as the input of the single digital bridge scale model of the entity bridge corresponding to the reference physical weighing system. By combining the input and output, the dataset [MVW(i, 0) ($1 \le i \le M$), Deformation(i, 1)] of the entity bridge corresponding to the reference physical weighing system can be established and obtained.

It will also be appreciated that the single digital bridge scale model MVW[i, 1]($1 \le i \le M$) obtained in the Step S240 can identify the total weight of the vehicle and is calibrated to dynamically adjust the abnormal vehicle data of the weighing system MVW[i, 0]($1 \le i \le M$).

It should be known that there may be a plurality of bridges in proximity to the reference physical weighing system MVW[i, 0]($1 \le i \le M$) to form bridge groups, i.e., there may be a plurality of single digital bridge scale models MVW[i, 1]($1 \le i \le M$) based on the reference physical weighing system MVW[i, 0]($1 \le i \le M$).

Specifically, in Step S220, the vehicle information is obtained by identifying the spatio-temporal matrix of the deformation data Deformation(i, j) by a neural network algorithm, which is then fused with the monitoring vehicle data on the bridge; the neural network algorithm adopts a long and short-term memory network (LSTM) model that fuses physical information. Combined with the a priori knowledge of the laws of physics, it can be effectively trained with less data, while improving the interpretability and prediction accuracy of the model.

(iii) As shown in FIGS. 1 and 2, the establishment of the branching scale network model includes:

Step S310: obtaining a reference model of the single digital bridge scale model MVW[i, j−1] by replicating the single digital bridge scale model MVW[i, j] through migration learning; where, $1 \le i \le M$, $2 \le j \le N$;

S320: using the dataset [MVW(i, j−1)($1 \le i \le M$, $2 \le j \le N$), Deformation(i, j)]transferred by the license plate number to correct the reference model to obtain the corrected single digital bridge scale model MVW[i, j] and a corresponding weighing result MVW(i, j), where, $1 \le i \le M$, $2 \le j \le N$;

S330: by analogy, forming the branch scale network model MVW{[i, j]} driven by the reference physical weighing system MVW[i, 0], where, $1 \le i \le M$, j=1, 2, ..., N.

It should be known that the migration learning in the Step S310 reduces large-scale data marking by using the generalization capability of the model to migrate the learned knowledge to a new task, thereby achieving efficient model training. The deep learning has a high accuracy and can achieve accurate transfer of data; then the data of the single digital bridge weighing model of the entity bridge corresponding to the reference physical weighing system can be accurately transferred to the entity bridge corresponding to the next transfer layer through the deep learning, thereby forming the desired single digital bridge weighing model. As the distance from the reference physical weighing system gradually increases, or the number of single digital bridge scale models gradually increases, the longer learning and training time may lead to the lower efficiency of data migration, thereby affecting the establishment of the branch scale network model. Therefore, when the distance from the reference physical weighing system is far or the number of single digital bridge scale models corresponding to the next transfer layer is large, data transfer can be carried out by migration learning. Migration learning can effectively reduce the training data of the model to improve the building efficiency of the branch scale network model.

Compared with the traditional way, the present application preprocesses dynamic deflection data by monitoring the bottom section of the bridge, and selects the appropriate neural network model to establish the dynamic deflection spatio-temporal matrix and inversion mapping relationship of the weight of the vehicle, to train the single digital bridge scale model, which can effectively use the bridge carriers to achieve the vehicle identification, and use the monitoring system to identify license plates to establish the license plate-weight of the vehicles of the data pairs, for providing a basic condition for the regional traffic heavy load network level identification and tracking. The migration learning is to provide the ability of rapid replication for deep learning models, which can achieve the construction of many digital models in the region.

In order to facilitate understanding, the following combines FIG. 2 with a branch scale network model as an example to carry out a detailed description of the building process.

As shown in FIG. 2, the black dot in the centre represents the reference physical weighing system MVW[i, 0](1≤i≤M), and the reference physical weighing system can be defaulted to layer 0. There are three transfer layers in addition to layer 0, i.e., N takes 3; the number k of single digital bridge scale models in the first layer is 4, the number k of single digital bridge scale models in the second layer is 8, and the number k of single digital bridge scale models in the third layer is 16. The single digital bridge scale model of the first layer corresponds to a bridge group nearby the reference physical weighing system. Then, according to the foregoing, the deep learning can be used for the single digital bridge scale models of the first layer for data transfer, and the migration learning can be used for the single digital bridge scale models of the second and third layers for data transfer.

For the first transfer layer, as shown in FIGS. 1 and 2, the vehicle feature information output matrix, Info_out(i, 0), of the reference physical weighing system MVW[i, 0] (1≤i≤M) is transferred via the license plate number to the bridge traffic flow monitoring of the entity bridges in the vicinity as the output of the model, and the structural response of the bridges is used as the input of the model, so that the dataset [MVW(i, 0) (1≤i≤M), Deformation(i, 1)] can be established. Then the dataset [MVW(i, 0) (1≤i≤M), Deformation(i, 1)] is trained by the deep learning and inversed to obtain the single digital bridge scale model MVW[i, 1]{k}(k=1, 2, 3, 4) of first layer. Further weight information of the vehicle is identified and fused with bridge traffic flow monitoring data to output the complete vehicle feature output information matrix Info_out(i, 1), i.e., the weighing result MVW(i, 1) of the single digital bridge scale model, where, 1≤i≤M.

For the second transfer layer, as shown in FIGS. 1 and 2, a reference model of the single digital bridge scale model MVW[i, 2](1≤i≤M) is obtained by replicating the single digital bridge scale model MVW[i, 1](1≤i≤M) by migration learning. Then the dataset [MVW(i, 1) (1≤i≤M), Deformation(i, 2)] passed by the license plate number is used for the correction of the reference model to obtain the corrected single digital bridge scale model MVW[i, 2]{k}(k=1, 2, . . . , 8) and the corresponding weighing result MVW (i, 2) (1≤i≤M).

For the third transfer layer, the migration learning is still used for replicating the single digital bridge scale model MVW [i, 2](1≤i≤M) to obtain the reference model of the single digital bridge scale model MVW [i, 3](1 (i≤M). Then the dataset [MVW(i, 2) (1≤i≤M), Deformation(i, 3)]transferred by the license plate number is used for the correction of the reference model to obtain the corrected single digital bridge scale model MVW[i, 3]{k}(k=1, 2, . . . , 16) and the corresponding weighing result MVW(i, 3) (1≤i≤M).

In this embodiment, for the establishment of the regional digital scale network model, as in the case of periodic calibration of the physical weighing system, the branch scale network models of the regional digital scale network model MVW{[i, j]}(i=1, 2, . . . , M, j=1, 2, . . . , . . . , and N) are linked to each other, affecting the whole body, and requiring more regular maintenance. And when a bridge structure is damaged, the input and output relationships of the originally high-precision single digital bridge scale model MVW[i, j](1 $ i≤M, 1≤j≤N) will change, which in turn leads to a decrease in the accuracy of its own model; accordingly, the single digital bridge scale model MVW[i, j+1](1≤i≤M, 1≤j≤N−1) all need to be adjusted. Therefore, a rigorous single model variation discovery mechanism, a scale network model iterative update logic, and a fast update method need to be determined in the step S400.

Specifically, in the Step S400, when there exists a cross section between different branch scale network models in the regional digital scale network model, a cross model needs to be verified; when nodes of the regional digital scale network model suffer a decrease in an accuracy of the model due to structural damage during long-term use, a damaged node model and subsequent node models need to be adjusted. For ease of understanding, a detailed description of the validation of the cross model and the process of determining node damage is provided below.

(i) The cross model can be validated by a formula:

$$\frac{|MVW(a, b) - MVW(c, d)|}{MVW(c, d)} \leq p; \quad (1)$$

In the formula, 1≤a≤c≤M, 1≤b≤d≤N; a, c and b, d are different time; p denotes a judgement threshold.

Based on the above formula (1), when the formula is established, the cross model is validated to pass; conversely, it needs to increase a training dataset to retrain a node model until the formula is established;

(2) the structural damage of nodes in the regional digital scale network model can be judged by using the following formula:

$$\frac{|MVW(i, j-1) - MVW(i, j)|}{MVW(i, j)} \leq p; \quad (2)$$

In the formula, 1≤i≤M, 1≤j≤N, 0≤x≤N−j; p denotes the judgement threshold.

Based on the above formula (2), when the formula is established, a structure corresponding to the node (i, j) is free of damage; conversely, it needs to add a new training dataset until the formula is established; and the node model MVW[i, j+x] is retrained according to a migration learning, where 0≤x≤N−j.

It should be known that after the node structure is damaged under natural aging and heavy load, the corresponding deflection characteristics under the same loading also change accordingly, so the vehicle weight inversion model based on the measured deflection spatio-temporal sequence is also necessarily no longer applicable. The vehicle information migrated from the license plate number through the previous bridge and the vehicle measurement value through the digital weighing model of this bridge are in error, and when the error reaches a certain degree, the model anomaly can be detected in time and iteratively updated with a new dataset on a step-by-step basis.

In this embodiment, for the threshold p, those skilled in the art may make a choice on his own according to the actual need, for example, p may be 0.05~0.1. The threshold p in the above-described formulas (1) and (2) may be the same, or different.

Another aspect of the present application provides a regional traffic heavy load digital synergy system for synergistic sharing of data obtained by the above regional traffic heavy load digital weighing method, which can be regarded as an application of the above regional digital weighing network mode, which can be divided into three main parts: health monitoring and analysis of the bridge, risk prediction and judgement, and auxiliary overload control.

Based on the different functions, the required data types are different, so the data can be classified for the above three functions before the functional application. For the health monitoring analysis of the bridge, the required data is the data set [MVW(i, j−1) (1≤i≤M, 1≤j≤N), Deformation(i, j) (1≤i≤M, 1≤j≤N)]. For risk prediction and judgement, and auxiliary overload control, the required data are the weighing results output from the regional digital weighing network model Info_out(i, j)[time, position, vehicle_ID, speed, axle_Num, total_weight].

Specifically, for health monitoring analysis of the bridge, the real-time regional heavy load distribution data provided by this application can be used to achieve bridge damage identification based on the combination of vehicle-bridge coupling analysis and neural network, which provides favourable data conditions for the structural lightweight health monitoring of bridges.

For the risk prediction and judgement, dangerous bridges can be screened based on operational load information of known weights, so as to realize risk-wide sensing and make advance prediction and judgement. In particular, real-time online optimization of driving paths of bulky vehicles based on the structural safety of bridges can be achieved.

For the auxiliary overload control, automated information recognition of heavy vehicles, non-stop weighing detection, on-site photo and video information capture and recording, and remote overloading risk determination can be realized, to grasp the city's overloading risk of freight vehicles in real time. According to the risk of overloading, the intelligence board is used to accurately and proactively issue the actual weighing instruction to the nearby overloading station, which expands and extends the time and space of overloading enforcement and supervision, and realizes remote and near connection with fixed overloading stations, closed-loop investigation and control, thereby greatly improving the discovery rate, interception rate and investigation rate of overloading vehicles.

The above describes the basic principle, the main features and the advantages of the present application. Those skilled in the art should understand that the present application is not limited by the above embodiments, and that what is described in the above embodiments and the specification is only the principle of the present application, and that there will be various changes and improvements to the present application without departing from the spirit and scope of the present application, and that these changes and improvements fall within the scope of the present application. The scope claimed herein is defined by the appended claims and their equivalents.

What is claimed is:

1. A regional traffic heavy load digital weighing method, comprising:
    Step S100: based on data of a physical weighing system in a region and basic data of a bridge in the region, selecting a number M of reference physical weighing systems MVW[i, 0], 1≤i≤M, and determining a number N of bridge group transfer layers;
    Step S200: based on each of the number M of reference physical weighing systems, constructing a corresponding single digital bridge scale model MVW[i, 1];
    Step S300: obtaining branch scale network models MVW{[i, j]} based on the reference physical weighing systems through migration learning and correction, 1≤i≤M, j=1, 2, . . . N;
    Step S400: composing a regional digital scale network model MVW{[i, j]} based on branch scale network models corresponding to different reference physical weighing systems, i=1, 2, . . . , M, j=1, 2, . . . , N;
    wherein the Step S100 comprises:
    Step S110: based on the provided data, drawing an overall traffic bridge network distribution in the region;
    Step S120: marking bridge groups with high technical condition ratings and corresponding weighing systems in a vicinity;
    Step S130: based on a principle of minimizing error transmission and a principle of minimizing cost of model consumption, selecting weighing systems from the weighing systems marked in the step S120 as the reference physical weighing systems MVW[i, 0];
    wherein the step S200 comprises:
    Step S210: constructing a structural response monitoring system at a key position of the bridge and a positive lateral traffic splicing identification system before the vehicle is on the bridge, to obtain a spatio-temporal matrix of the deformation data Deformation(i, j) and a vehicle feature input information matrix Info_in(i, j), respectively;
    Step S220: obtaining a vehicle feature output information matrix Info_out(i, j) based on a data fusion of the step S210;
    Step S230: passing, through a license plate number, the vehicle feature output information matrix Info_out(i, 0) corresponding to the reference physical weighing systems MVW [i, 0] to the positive lateral traffic splicing identification system as an output of the single digital bridge scale model, and using response data of the structural response monitoring system as an input of the single digital bridge scale model, to obtain a dataset [MVW(i, 0), Deformation(i, 1)] of the reference physical weighing systems corresponding to an entity bridge;
    Step S240: using a deep learning model to train the dataset [MVW(i, 0), Deformation(i, 1)] and inversing to obtain the single digital bridge scale model MVW[i, 1];
    wherein MVW(i, 0) denotes a weighing result of the reference physical weighing system;
    wherein the Step S300 comprises:
    Step S310: obtaining a reference model of the single digital bridge scale model MVW[i, j−1] by replicating the single digital bridge scale model MVW[i, j] through migration learning; wherein, 2≤j≤N;
    S320: using the dataset [MVW(i, j−1), Deformation(i, j)]transferred by the license plate number to correct the reference model to obtain the corrected single digital bridge scale model MVW[i, j] and a corresponding weighing result MVW(i, j);
    S330: by analogy, forming the branch scale network model MVW{[i, j]} driven by the reference physical weighing system MVW[i, 0];
    wherein in the Step S400, when there a are cross sections between different branch scale network models in the regional digital scale network model, branch scale network models with cross sections need to be verified.

2. The regional traffic heavy load digital weighing method according to claim 1, wherein the data provided in Step S100 comprises a name of the bridge, a position of the bridge, a type of the bridge, a length of the bridge, a width of the bridge, a technical condition of the bridge, and the time when the bridge is built and opened to traffic.

3. The regional traffic heavy load digital weighing method according to claim 1, wherein in the Step S220, vehicle load information is obtained by identifying the spatio-temporal matrix of the deformation data Deformation (i, 1) through a neural network algorithm, and the vehicle load information is fused with vehicle monitoring data of the bridge; wherein the neural network algorithm adopts a long and short-term memory network model that fuses physical information.

4. The regional traffic heavy load digital weighing method according to claim 1, wherein the branch scale network models with cross sections are validated by a formula:

$$\frac{|MVW(a, b) - MVW(c, d)|}{MVW(c, d)} \leq p;$$

when the formula is established, the is branch scale network models with cross sections are validated to pass; conversely, it needs to increase a training dataset to retrain a node model until the formula is established; wherein $1 \leq a \leq c \leq M$, $1 \leq b \leq d \leq N$; a, c and b, d are different at a same time; p denotes a judgement threshold with a value of 0.05~0.1.

5. The regional traffic heavy load digital weighing method according to claim 1, wherein the structural damage of the node in the regional digital weighing network model is judged by a formula:

$$\frac{|MVW(i, j-1) - MVW(i, j)|}{MVW(i, j)} \leq p;$$

when the formula is established, a structure corresponding to the node (i, j) is free of damage; conversely, it needs to add a new training dataset and retrain a node model MVW[i, j+x] according to the migration learning until the formula is established;
where $1 \leq i \leq M$, $1 \leq j \leq N$, $0 \leq x \leq N-j$; p denotes the judgement threshold with a value of 0.05~0.1.

6. A regional traffic heavy load digital synergy system, wherein data obtained by a regional traffic heavy load digital weighing method is classified and shared and managed, wherein the regional traffic heavy load digital weighing method comprises:
   Step S100: based on data of a physical weighing system in a region and basic data of a bridge in the region, selecting a number M of reference physical weighing systems MVW[i, 0], $1 \leq i \leq M$, and determining a number N of bridge group transfer layers;
   Step S200: based on each of the number M of reference physical weighing systems, constructing a corresponding single digital bridge scale model MVW[i, 1];
   Step S300: obtaining branch scale network models MVW{[i, j]} based on the reference physical weighing systems through migration learning and correction, $1 \leq i \leq M$, j=1, 2, . . . , N;
   Step S400: composing a regional digital scale network model MVW{[i, j]} based on branch scale network models corresponding to different reference physical weighing systems, i=1, 2, . . . , M, j=1, 2, . . . , N;
   wherein the Step S100 comprises:
   Step S110: based on the provided data, drawing an overall traffic bridge network distribution in the region;
   Step S120: marking bridge groups with high technical condition ratings and corresponding weighing systems in a vicinity;
   Step S130: based on a principle of minimizing error transmission and a principle of minimizing cost of model consumption, selecting weighing systems from the weighing systems marked in the step S120 as the reference physical weighing systems MVW[i, 0];

wherein the step S200 comprises:
   Step S210: constructing a structural response monitoring system at a key position of the bridge and a positive lateral traffic splicing identification system before the vehicle is on the bridge, to obtain a spatio-temporal matrix of the deformation data Deformation(i, j) and a vehicle feature input information matrix Info_in(i, j), respectively;
   Step S220: obtaining a vehicle feature output information matrix Info_out(i, j) based on a data fusion of the step S210;
   Step S230: passing, through a license plate number, the vehicle feature output information matrix Info_out(i, 0) corresponding to the reference physical weighing systems MVW [i, 0] to the positive lateral traffic splicing identification system as an output of the single digital bridge scale model, and using response data of the structural response monitoring system as an input of the single digital bridge scale model, to obtain a dataset [MVW(i, 0), Deformation(i, 1)] of the reference physical weighing systems corresponding to an entity bridge;
   Step S240: using a deep learning model to train the dataset [MVW(i, 0), Deformation(i, 1)] and inversing to obtain the single digital bridge scale model MVW[i, 1];
   wherein MVW(i, 0) denotes a weighing result of the reference physical weighing system;
   wherein the Step S300 comprises:
   Step S310: obtaining a reference model of the single digital bridge scale model MVW[i, j−1] by replicating the single digital bridge scale model MVW[i, j] through migration learning;
   wherein, $2 \leq j \leq N$;
   S320: using the dataset [MVW(i, j−1), Deformation(i, j)]transferred by the license plate number to correct the reference model to obtain the corrected single digital bridge scale model MVW[i, j] and a corresponding weighing result MVW(i, j);
   S330: by analogy, forming the branch scale network model MVW{[i, j]} driven by the reference physical weighing system MVW[i, 0];
   wherein in the Step S400, when there are cross sections between different branch scale network models in the regional digital scale network model, branch scale network models with cross sections need to be verified.

7. The regional traffic heavy load digital synergy system according to claim 6, wherein the data provided in Step S100 comprises a name of the bridge, a position of the bridge, a type of the bridge, a length of the bridge, a width of the bridge, a technical condition of the bridge, and the time when the bridge is built and opened to traffic.

8. The regional traffic heavy load digital synergy system according to claim 6, wherein in the Step S220, vehicle load information is obtained by identifying the spatio-temporal matrix of the deformation data Deformation (i, 1) through a neural network algorithm, and the vehicle load information is fused with vehicle monitoring data of the bridge; wherein the neural network algorithm adopts a long and short-term memory network model that fuses physical information.

9. The regional traffic heavy load digital synergy system according to claim 6, wherein the branch scale network models with cross sections are validated by a formula:

$$\frac{|MVW(a, b) - MVW(c, d)|}{MVW(c, d)} \leq p;$$

when the formula is established, the branch scale network models with cross sections are validated to pass; conversely, it needs to increase a training dataset to retrain a node model until the formula is established;

wherein $1 \leq a \leq c \leq M$, $1 \leq b \leq d \leq N$; a, c and b, d are different at a same time; p denotes a judgement threshold with a value of 0.05~0.1.

10. The regional traffic heavy load digital synergy system according to claim 6, wherein the structural damage of the node in the regional digital weighing network model is judged by a formula:

$$\frac{|MVW(i, j-1) - MVW(i, j)|}{MVW(i, j)} \leq p;$$

when the formula is established, a structure corresponding to the node (i, j) is free of damage; conversely, it needs to add a new training dataset and retrain a node model MVW[i, j+x] according to the migration learning until the formula is established;

where $1 \leq i \leq M$, $1 \leq j \leq N$, $0 \leq x \leq N-j$; p denotes the judgement threshold with a value of 0.05–0.1.

\* \* \* \* \*